United States Patent
Parees et al.

(10) Patent No.: US 9,727,330 B2
(45) Date of Patent: Aug. 8, 2017

(54) SOURCE TO IMAGE TRANSFORMATION PIPELINE FOR A PLATFORM-AS-A-SERVICE SYSTEM

(71) Applicant: Red Hat, Inc., Raleigh, NC (US)

(72) Inventors: Benjamin Parees, Durham, NC (US); Cesar Wong, Cary, NC (US); Clayton Coleman, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/952,188

(22) Filed: Nov. 25, 2015

(65) Prior Publication Data
US 2017/0147335 A1    May 25, 2017

(51) Int. Cl.
G06F 9/44      (2006.01)
G06F 9/445    (2006.01)
G06F 9/45      (2006.01)

(52) U.S. Cl.
CPC .......... G06F 8/71 (2013.01); G06F 8/30 (2013.01); G06F 8/40 (2013.01); G06F 8/60 (2013.01); G06F 8/20 (2013.01); G06F 8/34 (2013.01); G06F 8/65 (2013.01)

(58) Field of Classification Search
CPC ..... G06F 8/20; G06F 8/30; G06F 8/34; G06F 8/36; G06F 8/65; G06F 8/68; G06F 8/71
See application file for complete search history.

(56) References Cited

U.S. PATENT DOCUMENTS

| | | | |
|---|---|---|---|
| 8,850,514 B2 * | 9/2014 | McGrath | G06F 9/455 726/1 |
| 8,959,484 B2 | 2/2015 | Pinnix | |
| 9,100,401 B2 | 8/2015 | Stam et al. | |
| 9,122,562 B1 * | 9/2015 | Stickle | G06F 8/71 |
| 9,182,951 B1 * | 11/2015 | Ormerod | G06F 8/34 |
| 9,342,299 B2 * | 5/2016 | Goldstein | G06F 8/61 |

(Continued)

OTHER PUBLICATIONS

Oracle, "Making Infrastructure-as-a-Service in the Enterprise a Reality", Apr. 2012, Oracle Corporation, pp. 1-13; <http://www.oracle.com/us/products/enterprise-manager/infrastructure-as-a-service-wp-1575856.pdf>.*

(Continued)

*Primary Examiner* — Thuy Dao
*Assistant Examiner* — Ben C Wang
(74) *Attorney, Agent, or Firm* — Lowenstein Sandler LLP

(57) ABSTRACT

Implementations provide for a source to image transformation pipeline for a Platform-as-a-Service (PaaS) system. A method of the disclosure includes receiving a request to create an application for execution on a multi-tenant PaaS system, introspecting received source files associated with the application to identify at least one of a language or a framework corresponding to the application, identifying a build image corresponding to the identified at least one of the language or the framework, constructing a build configuration object, a deployment configuration object, and a networking configuration object for the application, and transmitting, by the processing device, the build configuration object, the deployment configuration object, and the networking configuration object to a master layer of the multi-tenant PaaS system to enable the multi-tenant PaaS system to build and deploy the application at one or more nodes of the multi-tenant PaaS system.

23 Claims, 6 Drawing Sheets

(56) References Cited

U.S. PATENT DOCUMENTS

| | | | |
|---|---|---|---|
| 9,419,856 B1* | 8/2016 | Chawla | H04L 41/0813 |
| 9,442,713 B2* | 9/2016 | Plax | G06F 17/3056 |
| 2011/0167405 A1 | 7/2011 | Min | |
| 2013/0232482 A1 | 9/2013 | Hassan et al. | |
| 2013/0298183 A1* | 11/2013 | McGrath | G06F 9/455 |
| | | | 726/1 |
| 2014/0075426 A1* | 3/2014 | West | G06F 8/65 |
| | | | 717/171 |
| 2014/0101632 A1 | 4/2014 | Young et al. | |
| 2014/0215312 A1* | 7/2014 | Hicks | G06F 17/30861 |
| | | | 715/235 |
| 2014/0215452 A1* | 7/2014 | Hicks | G06F 8/65 |
| | | | 717/172 |
| 2014/0244716 A1* | 8/2014 | Stam | H04W 4/003 |
| | | | 709/203 |
| 2014/0278623 A1* | 9/2014 | Martinez | G06F 8/36 |
| | | | 705/7.12 |
| 2014/0280438 A1* | 9/2014 | Shishkin | H04L 67/1008 |
| | | | 709/201 |
| 2015/0046921 A1 | 2/2015 | Allen | |
| 2015/0120938 A1* | 4/2015 | Mordani | H04L 41/5054 |
| | | | 709/226 |
| 2015/0193324 A1* | 7/2015 | McGrath | G06F 11/3409 |
| | | | 717/127 |
| 2015/0237114 A1* | 8/2015 | McGrath | H04L 67/42 |
| | | | 709/201 |
| 2015/0242197 A1* | 8/2015 | Alfonso | G06F 8/65 |
| | | | 717/173 |
| 2015/0242199 A1* | 8/2015 | Goldstein | G06F 8/61 |
| | | | 717/120 |
| 2015/0295824 A1* | 10/2015 | Chopra | G06F 9/45558 |
| | | | 709/223 |
| 2015/0296030 A1* | 10/2015 | Maes | G06F 9/5072 |
| | | | 715/736 |
| 2016/0147529 A1* | 5/2016 | Coleman | G06F 8/63 |
| | | | 717/120 |
| 2016/0216948 A1* | 7/2016 | McPherson | G06F 8/71 |

OTHER PUBLICATIONS

Kamal et al., "Mobile Platform as a Service a Case Study of User Friendly Approach to Mobile Strategy", ACM, Dec. 2015, pp. 1-5; <http://dl.acm.org/citation.cfm?id=2837163&CFID=739854759&CFTOKEN=65336817>.*

Ladhe et al., "Platform Design Considerations for Transforming a SaaS Solution to a PaaS Offering", IEEE, Dec. 2015, pp. 353-358, <http://ieeexplore.ieee.org/stamp/stamp.jsp?arnumber=7563662>.*

Parees, Benjamin, Wong, Cesar, Coleman, Clayton, OpenShift Product Documentation (../../../index.html), "Creating New Applications", https://docs.openshift.com/enterprise/3.0/dev_guide/new_app.html, [retrieved from the internet on Sep. 18, 2015], 13 pages.

GitHub, Inc., "Source-to-Image", https://github.com/openshift/source-to-image, 2015, 4 pages.

Google Cloud Platform, "Automated Image Builds with Jenkins, Packer, and Kubernetes", https://cloud.google.com/solutions/automated-build-images-with-jenkins-kubernetes, Aug. 27, 2015, 14 pages.

Tezer, O.S., "Docker Explained: Using Dockerfiles to Automate Building of Images", https://www.digitalocean.com/community/tutorials/docker-explained-using-dockerfiles-to-automate-building-of-images, Dec. 13, 2013, 15 pages.

Karzynski, Michal, "Packaging Django applications into Docker Container Images", http://michal.karzynski.pl/blog/2015/04/19/packaging-django-applications-as-docker-container-images, Apr. 19, 2015, 6 pages.

GitHub, Inc., "OpenShift Application Platform", https://github.com/openshift/origin, 2015, 5 pages.

* cited by examiner

SOURCE TO IMAGE TRANSFORMATION PIPELINE FOR A PLATFORM-AS-A-SERVICE SYSTEM

TECHNICAL FIELD

The implementations of the disclosure relate generally to Platform-as-a-Service (PaaS) systems and, more specifically, relate to a source to image transformation pipeline for a PaaS system.

BACKGROUND

A variety of Platform-as-a-Service (PaaS) system offerings exists that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on their computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware and software and provisioning hosting capabilities, providing the facilities to support the complete lifecycle of building and delivering web applications and services entirely available from the Internet. Typically, these facilities operate as one or more VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
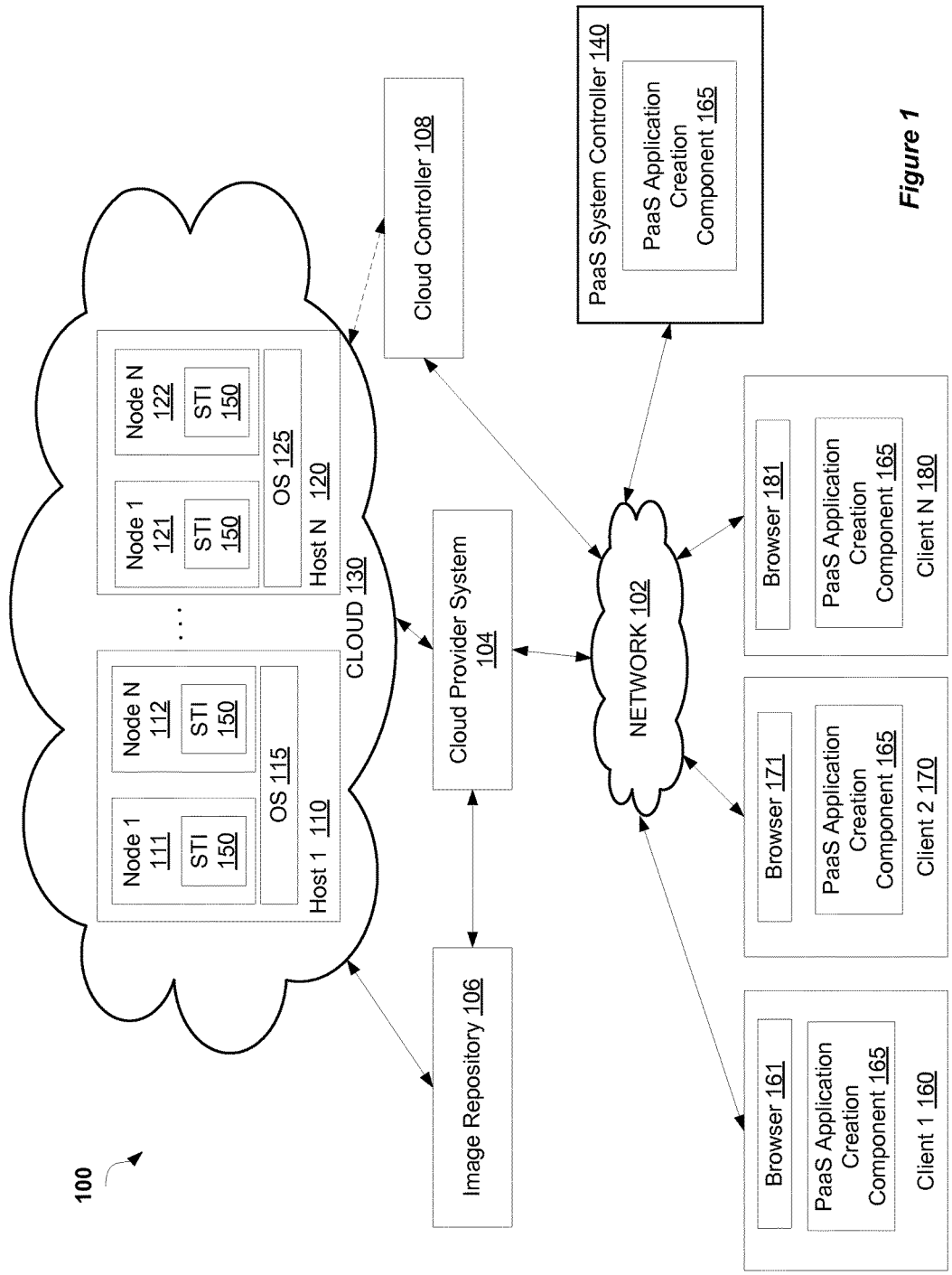
FIG. 1 is a block diagram of a network architecture in which implementations of the disclosure may operate.

Implementations of the disclosure provide for a source to image transformation pipeline for a Platform-as-a-Service (PaaS) system. Implementations provide a new PaaS application creation component that is implemented as part of a PaaS system. The PaaS application creation component can be implemented on client devices utilizing the PaaS system and/or on a server device executing a master layer of the PaaS system. In one implementation, the PaaS application creation component provides a tool to help automatically build and deploy a new application on the PaaS system with minimal to no manual intervention.

The PaaS application creation component simplifies the process for building and deploying an application in the PaaS system by analyzing an existing set of application source files ("source") and determining a build strategy for building the source, based on the language and framework the source appears to use. The PaaS application creation component then identifies an appropriate build image that is capable of building source, using the determined build strategy, for that particular language/framework into a new application image that can be deployed on the PaaS system. An image, such as a build image, refers to data representing executables and files of an application used to deploy functionality for a runtime instance of the application. In one implementation, a build image is an ordered collection of root filesystem changes and the corresponding execution parameters for use within a container runtime. An image typically contains a union of layered filesystems stacked on top of each other. An image does not have state and it does not change.

Next, the PaaS application creation component defines a build configuration, which takes as input the source and the identified build image, to generate the new application image. In addition to the build configuration, the PaaS application creation component also constructs a deployment configuration that takes as an input the new application image and, when the deployment configuration is executed, results in that application image being run on a deployment system of the PaaS (a system capable of running containerized application images). The PaaS application creation component defines networking configuration that enables the running application as created by the deployment to be accessible by users. The build configuration, deployment configuration, and networking configurations are all provided as objects for building, deploying, and running the application being created on the PaaS system.

Previous solutions generally have not provided an automated process to build and deploy a running application in a multi-tenant PaaS system using as input the source code from the end user (e.g., an application developer). Prior PaaS solutions dictated that the end user provide the manual specification of the build image to use to build the source files into a new application image. In addition, in prior PaaS solutions, the end user would also have to manually deploy any built application images to the deployment system and provide the proper networking configurations (e.g., routing, etc.) for other users to access the running application. Implementations of the disclosure automatically combine inputted source files with the appropriate build images, linking this together with configurations that allow the PaaS system to build and deploy a running application without any other interaction from the end user.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations, these nodes are virtual machines (VMs) that are hosted on a physical machine, such as host 1 110 through host N 120, configured as part of the cloud 130. For example, nodes 111 and 112 are hosted on physical machine 110 in cloud 130 provided by cloud provider 104. When nodes 111, 112, 121, 122 are implemented as VMs, they may be executed by OSes 115, 125 on each host machine 110, 120. Users can interact with applications executing on the cloud-based nodes 111, 112, 121, 122 using client computer systems, such as clients 160, 170 and 180, via corresponding web browser applications 161, 171 and 181.

In some implementations, the host machines 110, 120 are often located in a data center. In other implementations, the applications may be hosted directly on hosts 1 through N 110-120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

Upon receiving a command identifying specific data (e.g., application data and files used to initialize an application on the cloud), the cloud provider 104 retrieves the corresponding data from the image repository 106, creates an instance of it, and loads it to the host 110, 120 to run on nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, client devices 160-180 may include a PaaS application creation component 165 that automatically builds and deploys new applications on the nodes 111, 112, 121, 122 of the PaaS system with minimal end user interaction. In some implementations, the PaaS application creation component 165 may alternatively operate on the PaaS system controller 140, or may operate on a combination of the client devices 160-180 and PaaS system controller 140.

The PaaS application creation component 165 simplifies the process for building and deploying an application in the PaaS system by receiving specification of source files ("source") from an end user and analyzing the specified source. Based on the analysis of the source, the PaaS application creation component 165 identifies build images to associate with the source, constructs a build configuration that builds the source into a new application image, constructs a deployment configuration that deploys the new image, and constructs a networking configuration to allow the running application to be accessible. The build configuration, deployment configuration, and networking configurations are all provided as objects that can build, deploy, and run the application being created on the PaaS system.

In one implementation, nodes 111, 112, 121, 122 may include a source to image (STI) component 150 that utilizes the output objects (build configuration, deployment configuration, and networking configuration) to build and deploy a running application on the nodes 111, 112, 121, 122 using the end-user provided source. The STI component 150 provides a logic framework to produce ready-to-run application images for applications of the PaaS system. The STI component 150 may utilize the build configuration, deployment configuration, and networking configuration created by the PaaS application creation component 165 to generate a usable runtime image for the application in the PaaS system. In one implementation, the STI component 150 may utilize a Docker™ tool to build an application image, which is then referred to as a Docker image. Further details of PaaS application creation component 165 and its related workflows can be found below with respect to FIG. 2 through 5.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
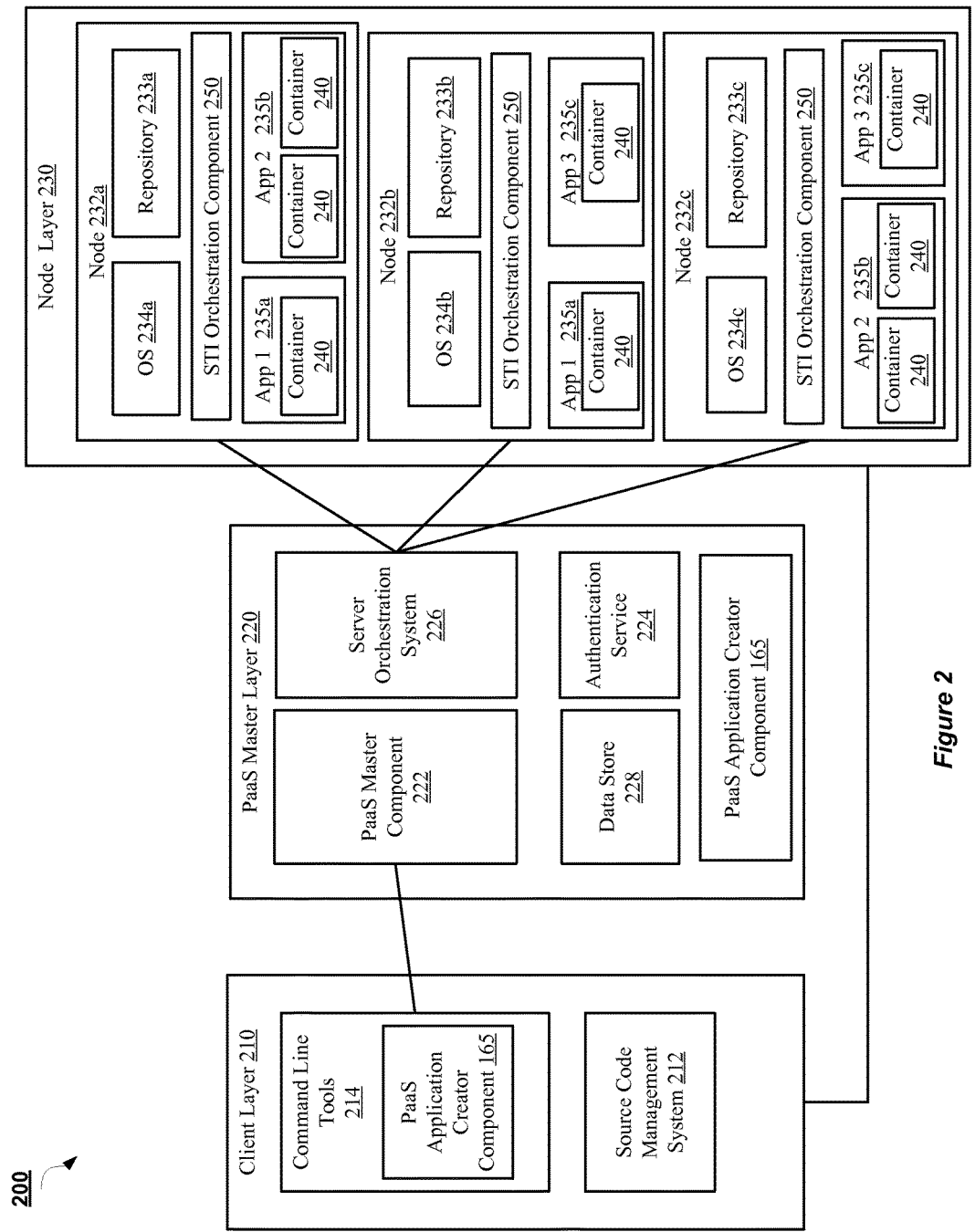
FIG. 2 is a block diagram of a multi-tenant Platform-as-a-Service (PaaS) system architecture according to an implementation of the disclosure.

FIG. 2 is a block diagram of a multi-tenant PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 is a collection of components that reside on a client machine, such as a workstation of a software developer, and provide an interface to a user of the client machine to the PaaS master layer 220 of the PaaS system 200. In one implementation, the client machine can be a client 160, 170, 180 described with respect to FIG. 1. The PaaS master layer 220 is a collection of components that may facilitate the creation and deployment on the cloud (via node layer 230) of software applications being developed by an end user at client layer 210. In one implementation, the PaaS master layer 220 may comprise components executing on one or more server devices.

In one implementation, the client layer 210 includes a source code management system 212, sometimes referred to as "SCM" or revision control system. One example of such an SCM or revision control system is Git, available as open source software. Git and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as will be described in more detail further below in accordance with some implementations.

In one implementation, the PaaS master layer 220 acts as middleware between the client layer 210 and the node layer 230. The node layer 230 is a collection of components that includes the nodes 232a-c on which applications 235a-b are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one implementation, a user, using the command line tools 214 at client layer 210, can request the creation of a new application 235a-b, deployment of source code of the application 235a-b, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-b residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-b to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-b that may be owned or managed by different users and/or organizations. As such, a first customer's deployed applications 235a-b may co-exist with any other customer's deployed applications on the same node 232 that is hosting the first customer's deployed applications 235a-b. In some implementations, portions of an application execute on multiple different nodes 232a-c. For example, as shown in FIG. 2, components of application 1 235*a* run in both node 232*a* and node 232*b*. Similarly, components of application 2 235*b* may run in node 232*b* and node 232*c*.

In one implementation, each node 232*a-c* is implemented as a VM and has an operating system 234*a-c* that can execute applications 235*a-c* using the repositories 233*a-c* that are resident on the nodes 232*a-c*. Each node 232*a-c* also includes a server orchestration system agent (not shown) configured to track and collect information about the node 232*a-c* and to perform management actions on the node 232*a-c*. The server orchestration system agent may operate in tandem with the server orchestration system 226 to send requests, queries, and commands between the node 232*a-c* and the PaaS master layer 220.

In one implementation, the client layer 210 may include a PaaS application creator component 165. The PaaS application creator component 165 may be the same as its counterpart described with respect to FIG. 1. The PaaS application creator component 165 may alternatively be implemented as part of the PaaS master layer 220, or may be implemented as part of a combination of the client layer 210 and the PaaS master layer 220. As discussed above, the PaaS application creation component 165 simplifies the process for building and deploying an application in the PaaS system 200 by receiving specification of source files ("source") from an end user and analyzing the specified source. Based on the analysis of the source, the PaaS application creation component 165 identifies build images to associate with the source, constructs a build configuration that builds the source into a new application image, constructs a deployment configuration that deploys the new image, and constructs a networking configuration to allow the running application to be accessible. The build configuration, deployment configuration, and networking configurations are all provided as objects that can build, deploy, and run the application being created on the PaaS system.

In one implementation, nodes 232*a-c* may include an STI component 250. STI component 250 may be the same as STI component 150 described with respect to FIG. 1. STI component 250 may utilize the output objects (build configuration, deployment configuration, and networking configuration) of the PaaS application creator component 165 to build and deploy a running application on the nodes 232*a-c* using the end-user provided source. The STI component 250 provides a logic framework to produce ready-to-run application images for applications 235*a-c* of the PaaS system. The STI component 250 may utilize the build configuration, deployment configuration, and networking configuration created by the PaaS application creation component 165 to generate a usable runtime image for the application in the PaaS system. Further details of the automated application creation process are described below with respect to FIG. 3.

Each application image may map to a functional component of the application 235*a-c*. As such, an application may have more than one application image associated with the application. The application images include support software providing functionality (e.g., configuration templates, scripts, dependencies, etc.) used to run the application 235*a-c* and/or add a feature to the application 235*a-c*. For example, the images may support languages such as, but not limited to, Java™, PHP, Ruby, Python, Perl, and so on. In addition, application images may be generated that support databases, such as MySQL™ PostgreSQL™, Mongo™, and others. Application images may also be generated that support build and continuous integration environments, such as a Jenkins-based image. Lastly, application images may be generated to support management capabilities and/or tools, such as PHPmyadmin, RockMongo™, 10gen-mms-agent, cron scheduler, HAProxy, Maven, and Gradle for example.

Once STI component 250 builds an application image, the application image may be committed to a repository, such as repository 233*a-c* or to a remote repository (not shown) outside of nodes 232*a-c*. The committed application image may then be used to subsequently launch the application 235*a-c*.

As discussed above, the application images include the underlying support software that implements the functionality of applications 235*a-c*. In one implementation, an application 235*a-c* may utilize one or more resource-constrained containers 240 on nodes 232*a-c* using instances of application image. A container 240 is a resource-constrained process space on the node 232*a-c* to execute functionality of an application 235*a-c*. In some implementations, a container 240 is established by the node 232*a-c* with resource boundaries, including a limit and/or designation of the amount of memory, amount of storage, and security types and/or labels to be applied to any functions executed by the container 240. In one implementation, containers 240 may be established using Linux Containers (LXC) or Docker containers. In further implementations, containers 240 may also be established using more primitive features, such as cgroups, SELinux™, and kernel namespaces, to name a few examples.

Application image instances for an application 235*a-c* may be launched in containers 240 dispersed over more than one node 232*a-b*. In other implementations, application images instances for an application 235*a-c* may run in one or more containers 240 on the same node 232*a-c*. Furthermore, an application 235*a-c* may use more than one application image 240 as part of providing functionality for the application 235*a-c*. One example of this is a JavaEE™ application that uses a JBoss™ application server-based application image with a supporting MySQL™ database provided by a MySQL™-based application image.

Figure 3:
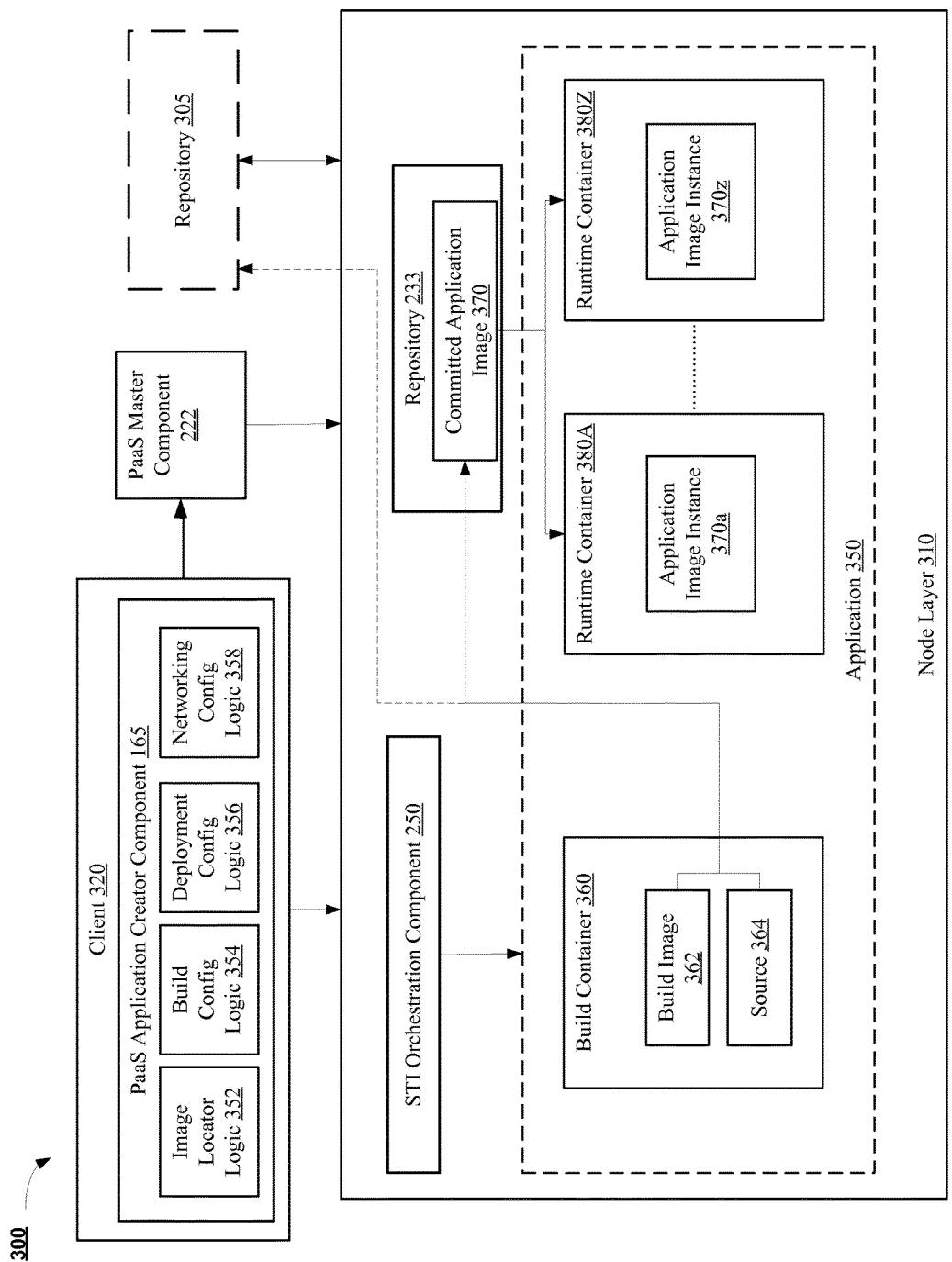
FIG. 3 is a block diagram of a communication architecture of a multi-tenant PaaS providing a source to image transformation pipeline for applications of the multi-tenant PaaS system according to an implementation of the disclosure.

FIG. 3 is a block diagram of a communication architecture 300 of a multi-tenant PaaS providing a source to image transformation pipeline for applications of the multi-tenant PaaS system according to an implementation of the disclosure. Architecture 300 includes the PaaS master component 222 in communication with a client 320 and node layer 310. Node layer 310 includes STI orchestration component 250, repository 233, and application 350 (which includes container 360 and 380 distributed across one or more nodes of node layer 310). Client 320 includes a PaaS application creator component 165. PaaS application creator component 165, PaaS master component 222, STI orchestration component 250, and repository 233 may be the same as their counterparts described with respect to FIG. 2.

In one implementation, the PaaS application creator component 165 would receive a request to create a new application. The request may be received via a CLI or via a web console interface provided by the PaaS system via the client device 320. The request received at the PaaS application creator component 165 includes specification of source files ("source") for the new application. The source files may include source code, images, or templates. A template is a set of objects that can be parameterized and processed to produce a list of objects for creation by the PaaS system.

The PaaS application creator component 165 includes image locator logic 352 that first determines a build strategy for building the source, based on the language and framework that the source appears to use. The image locator logic 352 can introspect the specified source to determine the language and framework of the source. A build is the process of transforming input parameters into a resulting object. The build process is often used to transform source code into a runnable image. A build strategy defines the type of build supported by the PaaS system, including the commands used by the build, and the repositories and artifacts expected to be used by the build. One example build strategy is a Docker build strategy. Another example build strategy is a source strategy. The type of build strategy to define for the source may be based on the files found in the specified source (e.g., if a Dockerfile is found in a repository of the source, then a Docker build strategy is specified). Furthermore, the presence of certain marker files in the source can also be used to determine the language and/or framework to associate with the source (e.g., presence of a Gemfile in the source would indicate the Ruby language).

The image locator logic 352 then identifies an appropriate build image that is capable of building the source, using the determined build strategy, for that particular language/framework into a new application image that can be deployed on the PaaS system. The image locator logic 352 may look for images in a local registry, a public registry, or stored at a server of the PaaS system. In some implementations, if multiple possible matches for build images are found, the image locator logic 352 may apply weights to the different images based on, for example, how accurately the name matches to the determined language/platform of the source. Other factors contributing to a weight may include how accurate of a match metadata information of the located build image has with the determined language/platform of the source. The weights may then be used to apply scores to each potential build image for purposes of determining a highest scoring build image to select for the source.

Once a build image is selected, build config logic 354 of the PaaS application creation component 165 defines a build configuration. The build configuration is an object that defines the entire build process. The build configuration may also be referred to as a build configuration object. The generated build configuration takes as input the source and the identified build image and generates a new application image. The build configuration specifies the build strategy to use, the source location, and the build output location. For the build configuration, two image streams may be created: one to represent the input image (the build image) and another to represent the output image. In one implementation, the build configuration is a REST object that can be used in a POST to the PaaS server to create the new application image instance.

In addition to the build config logic 354, the PaaS application creation component 165 also includes deployment config logic 356 that constructs a deployment configuration. The deployment configuration is an object that defines details of the deployment, such as replication control definitions, triggers for creating new deployments automatically, strategy for transitioning between deployments, and lifecycle hooks. The deployment configuration may also be referred to as a deployment configuration object. The deployment configuration takes as an input the new application image and, when the deployment configuration is executed, results in that application image being run on a deployment system of the PaaS (a system capable of running containerized application images). The deployment configuration is created either to deploy the output of a build, or a specified image.

In some implementations, the deployment configuration object causes the new application image to be analyzed and determines if the image declares a "volume". A volume may refer to a mounted file system that is available to the application and which may be backed by a number of node-local or network attached storage endpoints. If the new application image does declare one or more volumes, then the deployment configuration object can match the volume to attached storage in the PaaS, which then provides persistent storage for the application, located at a file path defined by the volume declaration.

The PaaS application creation component 165 further includes networking config logic 358 that defines networking configuration that enables the running application as created by the deployment to be accessible by users. The networking configuration may also be referred to as a networking configuration object. The networking configuration attempts to detect exposed ports in the source. It uses the lowest numeric exposed port to generate a service that exposes the port.

Once generated, the build configuration, deployment configuration, and networking configurations are all provided as objects that can build, deploy, and run the application being created on the PaaS system. In one implementation, the build configuration, deployment configuration, and networking configuration are passed to PaaS master component 222. PaaS master component 222 would then invoke STI orchestration component 250. STI orchestration component 250 may use the build configuration to inject the source (identified in the build configuration) for an application into a base image providing core functionality for the application (e.g., also identified in the build configuration) in order to assemble an application image (i.e., base image+source code) for running the application on the PaaS system.

In one implementation, STI orchestration component 250 may launch a build container 360. The build container 360 may be a resource-constrained process space on the node layer 310 that executes the received build configuration object to combine the build image 362 and the source 364 to create the new application image. In some implementations, build container 360 is established with resource boundaries, including a limit and/or designation of the amount of memory, amount of storage, and security types and/or labels to be applied to any functions executed by the build container 360.

The build image 362 may be maintained in a repository of the multi-tenant PaaS, such as repository 233 of node layer 310, or in a remote repository 305 maintained outside of node layer 310. As discussed above, the build image 362 may be associated with core functionality of the application, such as application frameworks including, but not limited to, PHP™, Ruby™, J2EE™, and so on.

Logic of the build container 360 may then apply the application source 364 (e.g., binaries, zipped source, source code, etc.) to the build image 362 to build or assemble the new application image. The application source 364 may be provided to build container 360 through various delivery methodologies. In one implementation, the application source 364 may be streamed, for example, as a TAR file to the build container 360. The application source 364 may be streamed from a client device of an end user, or from another remote location indicated by the user. In another implementation, the application source 364 may be bind-mounted to the build container 360. In a further implementation, the application source 364 may be accessed or downloaded using a remote Uniform Resource Locator (URL) provided to build container 360. When the new application image is built, the logic run by build container 360 causes the application image to be committed to a repository 233, 305.

The STI orchestration component 250 may also use the deployment configuration and the networking configuration to cause the assembled application image to be deployed on the node layer 310. The deployment configuration and the networking configuration may cause the committed application image 370 to be used to subsequently launch the application 350. As discussed above, the deployment configuration provided by PaaS application creator component 165 defines behaviors to be executed when one or more runtime containers 380A-Z are launched from the committed application image 370. Multiple runtime containers 380A-Z may launch using instances 370a-z of built application image 370 in order to scale up the functionality provided by application image 370 in application 350.

Figure 4:
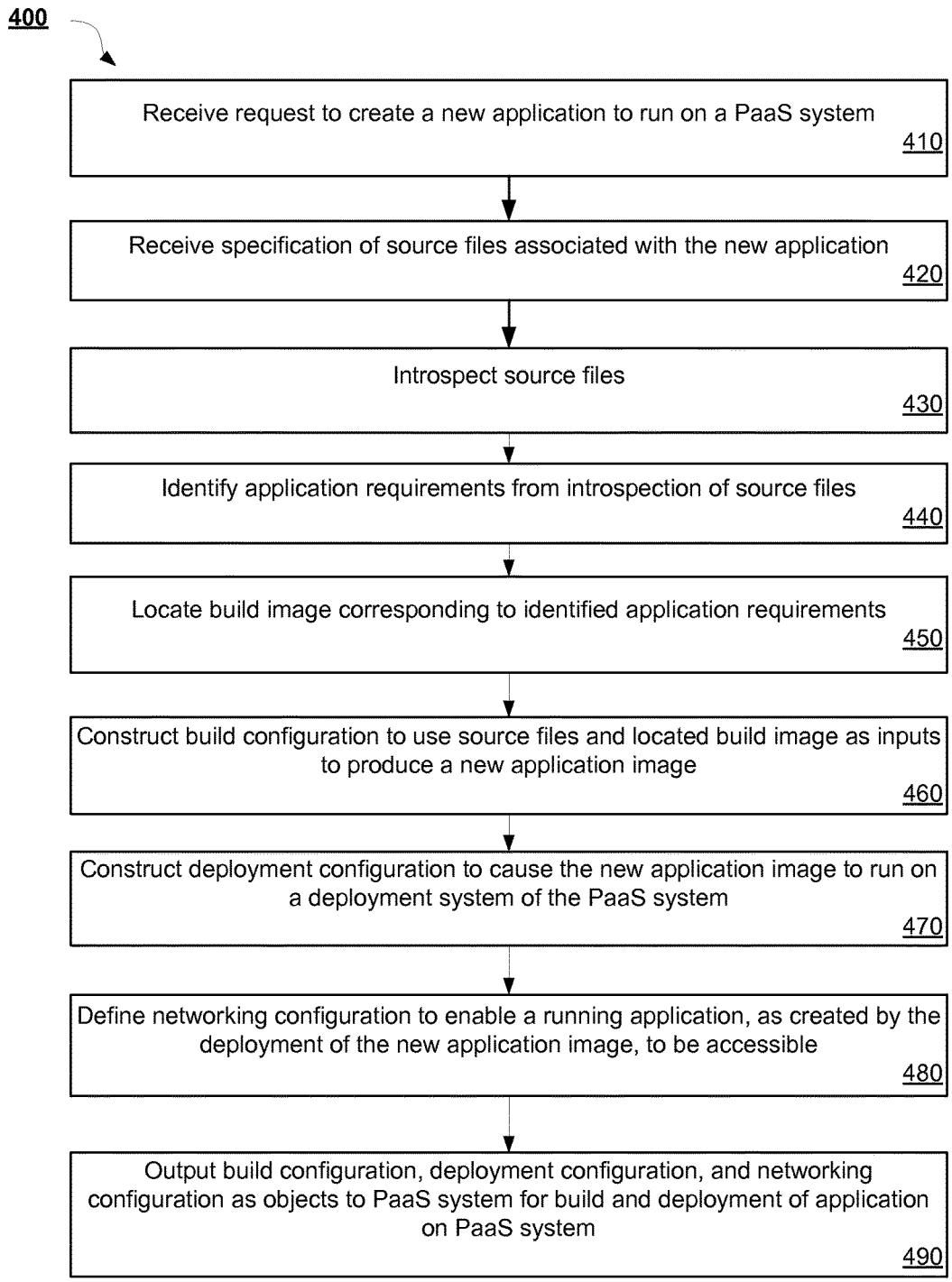
FIG. 4 is a flow diagram illustrating a method for a PaaS application creation component to provide a source to image transformation pipeline for a PaaS system according to an implementation of the disclosure.

FIG. 4 is a flow diagram illustrating a method 400 for a PaaS application creation component to provide a source to image transformation pipeline for a PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by PaaS application creator component 165, of FIGS. 2 and 3.

Method 400 begins at block 410 where a request is received to create a new application to run on a PaaS system. Then, at block 420, specification of source files associated with the new application are received. At block 430, the source files are introspected. Subsequently, at block 440, application requirements are identified based on the introspection of the source files.

At block, 450, a build image corresponding to the identified application requirements is located. Then, at block 460, a build configuration is constructed. The build configuration uses the source files and the located build image as inputs to produce a new application image. Then, at block 470, a deployment configuration is constructed to cause the new application image to run on a deployment system of the PaaS system. At block 480, a networking configuration is defined to enable a running application, as created by a deployment of the new application image, to be accessible. Lastly, at block 490, the build configuration, deployment configuration, and networking configuration are outputted as objects to the PaaS system. These objects may then be used for a subsequent build and deployment of the application on the PaaS system.

Figure 5:
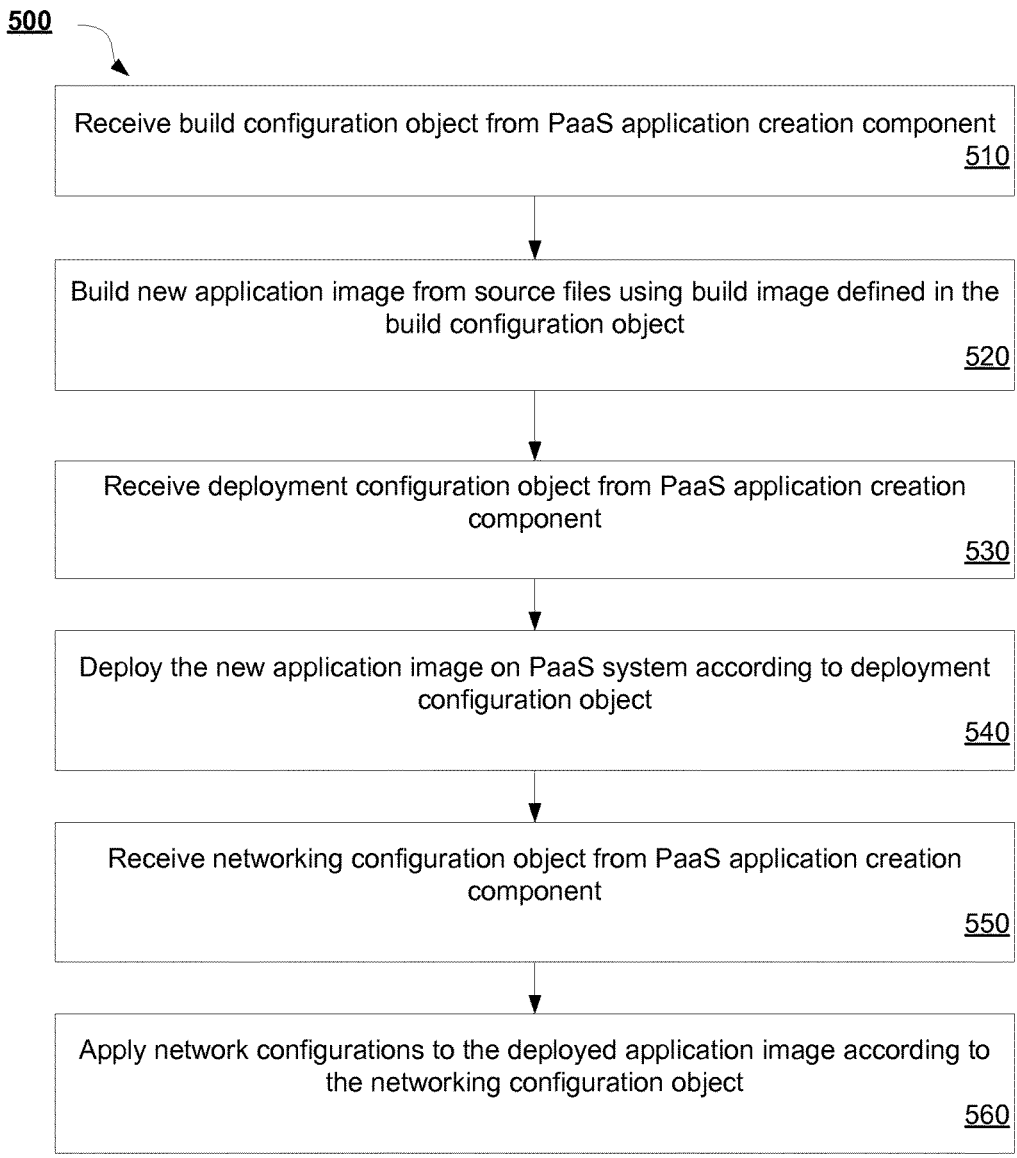
FIG. 5 is flow diagram illustrating a method for building and deployment of an application on a PaaS system using a source to image transformation pipeline according to implementations of the disclosure.

FIG. 5 is a flow diagram illustrating a method 500 for building and deployment of an application on a PaaS system using a source to image transformation pipeline according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by STI orchestration component 250, of FIGS. 2 and 3.

Method 500 begins at block 510 where a build configuration object is received from a PaaS application creation component. At block 520, a new application image is built from source file using a build image, where the source files and build image are both specified in the build configuration object. In one implementation, the new application image is built using a build strategy that is also identified in the build configuration.

Then, at block 530, a deployment configuration is received from the PaaS application creation component. At block 540, the new application image is deployed on the PaaS system according to the deployment configuration object. Subsequently, at block 550, a networking configuration object is received from the PaaS application creation component. At block 560, network configurations are applied to the deployed application image according to the networking configuration object. In some implementations, the build, deployment, and networking configurations may all be received at the same time or separately.

Figure 6:
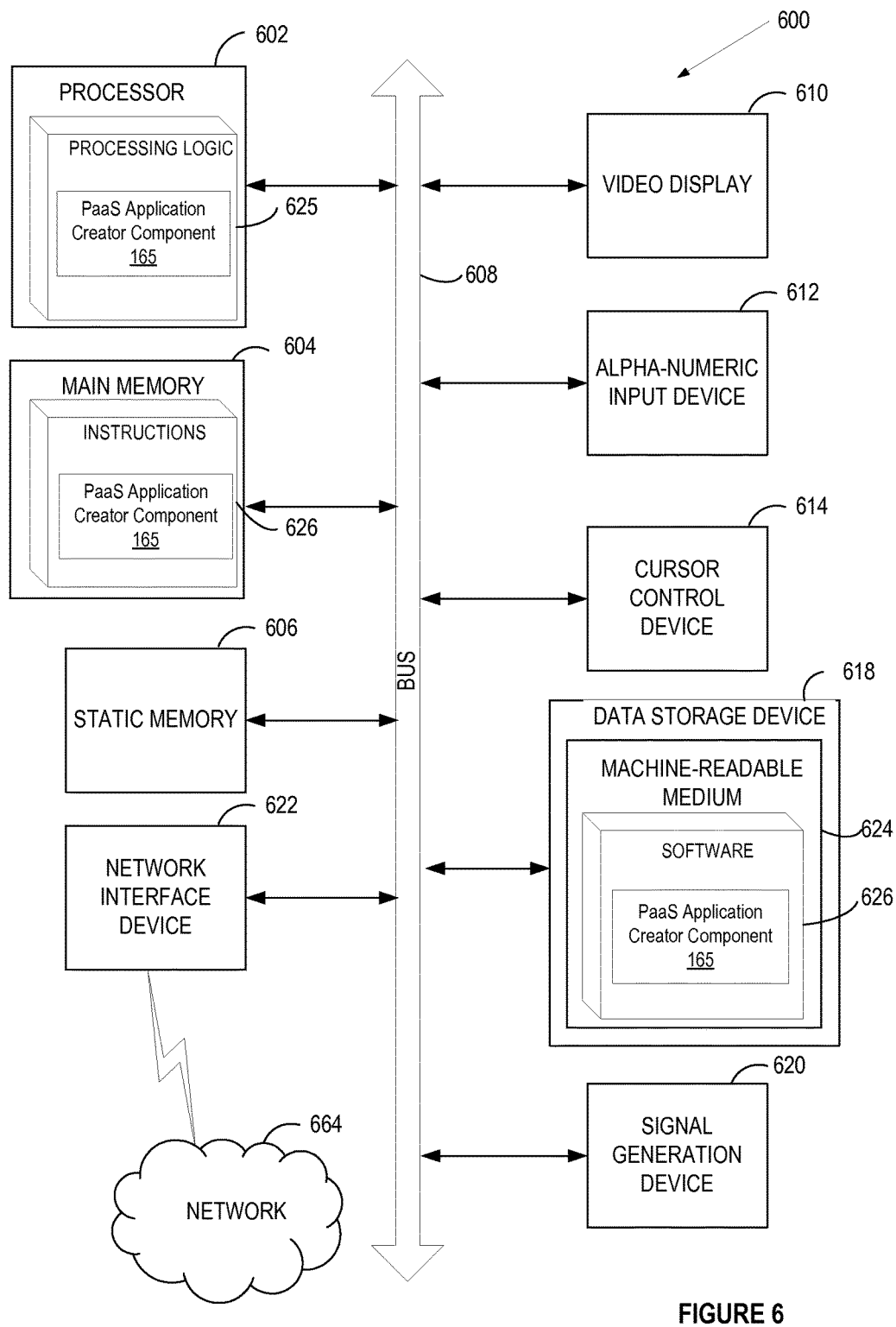
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement PaaS application creation component 165 to provide a source to image transformation pipeline for a PaaS system in a computer system, such as the computer system described with respect to FIG. 1, and/or a software library containing methods that call the above applications. While the machine-accessible storage medium 628 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "invoking", "launching", "accessing", "assembling", "committing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
receiving a request to create an application for execution on a multi-tenant Platform-as-a-Service (PaaS) system;
receiving identification of source files associated with the application;
introspecting, by a processing device, the source files to identify at least one of a language or a framework corresponding to the application;
identifying, by the processing device, a build image corresponding to the identified at least one of the language or the framework;
constructing, by the processing device, a build configuration object, a deployment configuration object, and a networking configuration object for the application; and
transmitting, by the processing device, the build configuration object, the deployment configuration object, and the networking configuration object to a master layer of the multi-tenant PaaS system to enable the multi-tenant PaaS system to build and deploy the application at one or more nodes of the multi-tenant PaaS system without user intervention.

2. The method of claim 1, wherein the build image provides a core functionality of the application.

3. The method of claim 1, wherein the build configuration object, the deployment configuration object, and the networking configuration object enable the multi-tenant PaaS system to build and deploy the application at the one or more nodes of the multi-tenant PaaS system without any interaction with an end user that requested to create the application.

4. The method of claim 1, wherein the build configuration object comprises an object that defines a build process for the application, and wherein the build configuration object takes as input the source files and the identified build image and generates a new application image.

5. The method of claim 4, wherein the deployment configuration object comprises an object that defines details of deployment of the new application image, and wherein the details of the deployment comprise at least one of replication control definitions, triggers for creating new deployments automatically, strategy for transitioning between deployments, or lifecycle hooks.

6. The method of claim 4, wherein the deployment configuration object is further to:
   determine that the image declares a volume; and
   match the volume to attached storage in the multi-tenant PaaS system, the attached storage to provide persistent storage for the application located at a file path defined by the volume declaration.

7. The method of claim 5, wherein the networking configuration object enables the application as created by the deployment to be accessible by one or more end users, and wherein the networking configuration detects exposed ports in the source files and uses a lowest numeric exposed port to generate a service that exposes the lowest numeric exposed port.

8. The method of claim 1, wherein the build image is located in at least one of a local repository of an end user device originating the request to create the new application, a remote repository, or a data store of the multi-tenant PaaS system.

9. The method of claim 1, wherein the build image is identified in view of a weighted score applied to the build image, the weighted score reflecting an accuracy of the build image matching the at least one of the language or the framework of the introspected source files.

10. The method of claim 1, wherein the source files comprise at least one of source code, images, or templates.

11. The method of claim 1, wherein the one or more nodes of the multi-tenant PaaS system execute multiple applications comprising at least the application, and wherein the multiple applications are owned by different owners.

12. A system, comprising:
a memory;
a processing device communicably coupled to the memory, the processing device to:
   receive a request to create an application for execution on a multi-tenant Platform-as-a-Service (PaaS) system;
   receive identification of source files associated with the application;
   introspect the source files to identify at least one of a language or a framework corresponding to the application;
   identify a build image corresponding to the identified at least one of the language or the framework;
   construct a build configuration object, a deployment configuration object, and a networking configuration object for the application; and
   transmit the build configuration object, the deployment configuration object, and the networking configuration object to a master layer of the multi-tenant PaaS system to enable the multi-tenant PaaS system to build and deploy the application at one or more nodes of the multi-tenant PaaS system without user intervention.

13. The system of claim 12, wherein the build configuration object, the deployment configuration object, and the networking configuration object enable the multi-tenant PaaS system to build and deploy the application at the one or more nodes of the multi-tenant PaaS system without any interaction with an end user that requested to create the application.

14. The system of claim 12, wherein the build configuration object comprises an object that defines a build process for the application, and wherein the build configuration object takes as input the source files and the identified build image and generates a new application image.

15. The system of claim 14, wherein the deployment configuration object comprises an object that defines details of deployment of the new application image, and wherein the details of the deployment comprise at least one of replication control definitions, triggers for creating new deployments automatically, strategy for transitioning between deployments, or lifecycle hooks.

16. The system of claim 14, wherein the deployment configuration object is further to:
   determine that the image declares a volume; and
   match the volume to attached storage in the multi-tenant PaaS system, the attached storage to provide persistent storage for the application located at a file path defined by the volume declaration.

17. The system of claim 15, wherein the networking configuration object enables the application as created by the deployment to be accessible by one or more end users, and wherein the networking configuration detects exposed ports in the source files and uses a lowest numeric exposed port to generate a service that exposes the lowest numeric exposed port.

18. The system of claim 12, wherein the build image is identified in view of a weighted score applied to the build image, the weighted score reflecting an accuracy of the build image matching the at least one of the language or the framework of the introspected source files.

19. A non-transitory machine-readable storage medium including instructions that, when accessed by a processing device, cause the processing device to:
   receive a request to create an application for execution on a multi-tenant Platform-as-a-Service (PaaS) system;
   receive identification of source files associated with the application;
   introspect, by the processing device, the source files to identify at least one of a language or a framework corresponding to the application;
   identify, by the processing device, a build image corresponding to the identified at least one of the language or the framework;
   construct, by the processing device, a build configuration object, a deployment configuration object, and a networking configuration object for the application; and
   transmit, by the processing device, the build configuration object, the deployment configuration object, and the networking configuration object to a master layer of the multi-tenant PaaS system to enable the multi-tenant PaaS system to build and deploy the application at one or more nodes of the multi-tenant PaaS system without user intervention.

20. The non-transitory machine-readable storage medium of claim 19, wherein the build configuration object comprises an object that defines a build process for the application and generates the application image, and wherein the build configuration object takes as input source files corresponding to the application and the build image corresponding to the at least one of the language or the framework determined from introspection of the input source files.

21. The non-transitory machine-readable storage medium of claim 20, wherein the deployment configuration object comprises an object that defines details of deployment of the application image, and wherein the details of the deployment comprise at least one of replication control definitions, triggers for creating new deployments automatically, strategy for transitioning between deployments, or lifecycle hooks.

22. The non-transitory machine-readable storage medium of claim 20, wherein the deployment configuration object is further to:

determine that the application image declares a volume; and match the volume to attached storage in the multi-tenant PaaS system, the attached storage to provide persistent storage for the application located at a file path defined by the volume declaration.

23. The non-transitory machine-readable storage medium of claim 21, wherein the networking configuration object enables the deployed application to be accessible by one or more end users, and wherein the networking configuration detects exposed ports in the input source files and uses a lowest numeric exposed port to generate a service that exposes the lowest numeric exposed port.

* * * * *